Feb. 1, 1949.
J. M. BENTON
2,460,443
PHOTOGRAPHIC ENLARGER EXPOSURE INDICATOR
Filed May 9, 1946
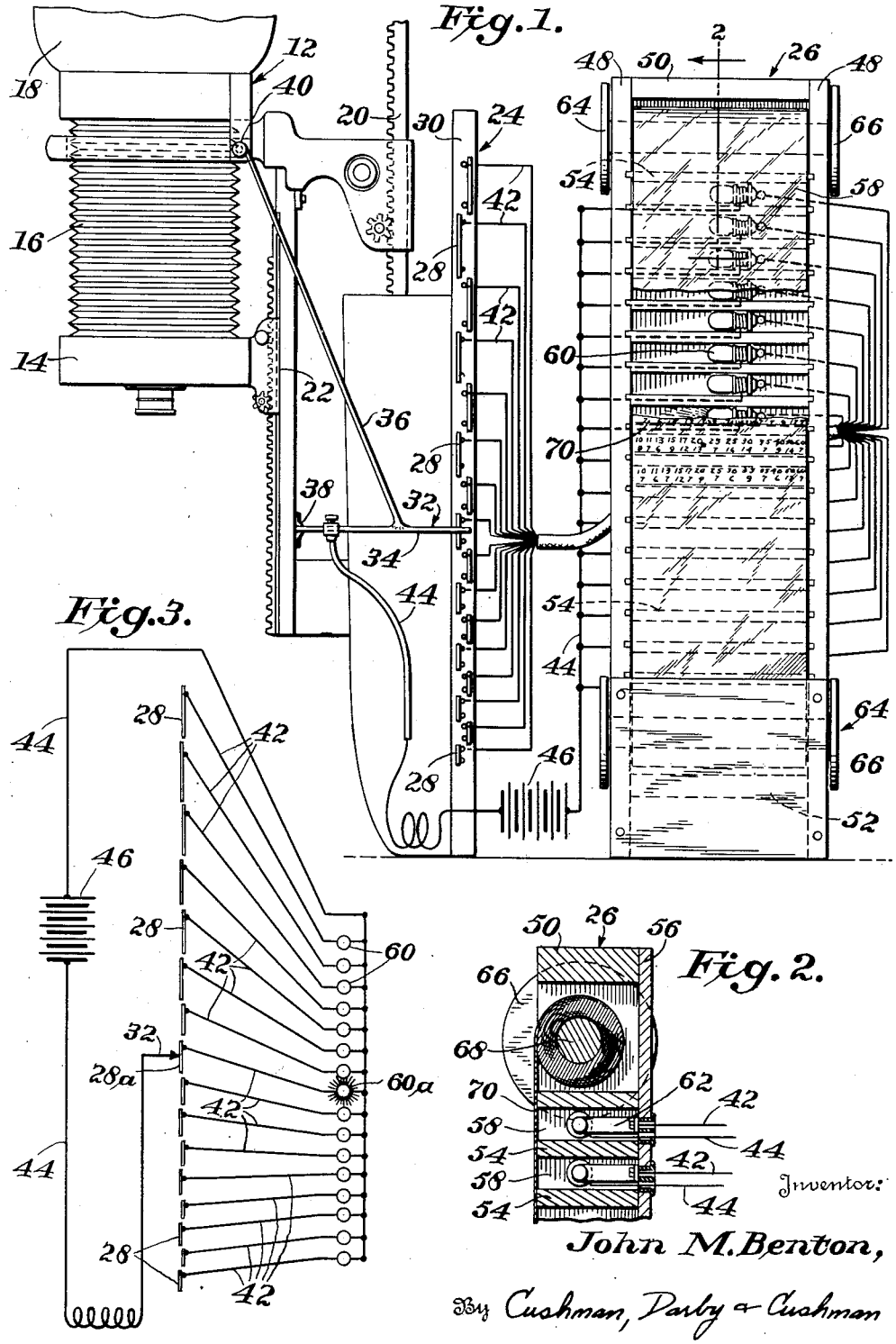

Patented Feb. 1, 1949

2,460,443

UNITED STATES PATENT OFFICE 2,460,443

PHOTOGRAPHIC ENLARGER EXPOSURE INDICATOR

John M. Benton, West Palm Beach, Fla.

Application May 9, 1946, Serial No. 668,341

8 Claims. (Cl. 88—24)

This invention relates to photographic apparatus and more particularly it is concerned with devices for indicating photographic enlargement exposure requirements.

A principal object of this invention is the provision of apparatus for use with photographic enlargers in order to automatically inform the operator of the correct exposure to be used with the enlarger for any given density negative and for any size of enlargement within the range of the apparatus. Another object is the provision of exposure indicating devices for association with photographic enlargers which automatically indicate, even in the dark, the exposure to be employed in the operation of the enlarger. A still further object is the provision of devices which compensate for emulsion speed, size of enlargement, negative density and the like and, thus, automatically compute and indicate length of exposure in photographic enlargement processes. Another object is the provision of an improved method for making photographs by projection printing. Still further objects and the entire scope of applicability of this invention will become apparent from the detailed description given hereinafter.

These objects are accomplished according to the present invention by the provision of exposure indicating devices, the structure of which may be most readily comprehended by reference to the attached drawing, in which:

Figure 1 is a schematic representation partly in section of one embodiment of the exposure indicating devices of this invention operatively connected to a photographic enlarger.

Figure 2 is an enlarged fragmentary section of part of the exposure device shown in Figure 1, taken along the line 2—2 of Figure 1.

Figure 3 is a schematic diagram of the electrical wiring in the exposure device, illustrated in Figure 1.

Referring in detail to the drawing, there is shown an enlarger 12 having a lens part 14, bellows 16, and a plate holder and light source 18. The enlarger 12 is mounted in well-known fashion for movement relative to a printing surface (not shown) upon a rack and pinion arrangement 20. The enlarger 12 is further provided with another rack and pinion arrangement 22 which permits the lens part 14 to be moved relative to the light source and plate carrier 18, so as to focus the enlarger when the height of the enlarger from the printing surface is changed in order to increase or decrease the size of enlargement.

The enlarger as described above is standard equipment known to the art and does not constitute a portion of the present invention. The exposure device to which this invention relates is formed, in the embodiment illustrated in Figure 1, of 2 parts, i. e., an electrical contact portion 24 and a register unit 26.

The electrical contact portion 24 consists of a series of electrical contact elements 28 which are held in fixed position, relative to the enlarger adjusting rack 20 and the printing surface, by being mounted upon a strip of insulating material 30. The other important part of the contact portion 24 is a slidable electrical contact 32. This slidable contact 32, in the illustrated embodiment, consists of 2 sections 34 and 36 of heavy wire which are welded together. The ends of these wires 34 and 36 are fastened by means 38 and 40 to the enlarger. Thus, movements of the enlarger 12 relative to the adjusting rack 20 and the printing surface produce a corresponding movement in the sliding contact 32.

Each of the stationary electrical contact elements is provided with an electrical conductor 42 which connects these contact elements to the register box 26. Furthermore, the slidable contact 32 is provided with an electric conductor 44 which connects the slidable contact through battery 46 to the register box 26.

The register box 26 consists of a rectangular box having sides 48, top portion 50, bottom portion 52, shelf portions 54, and back 56. The shelf portions 54 divide the register box 26 into a number of separate compartments 58. In each of the separate compartments 58 is positioned a small electric light 60 which is held in rigid position therein by means of the lamp holders 62.

At both ends of the box 26 are spools 64, each of which consist of two circular end plates 66 and a rod portion 68 which extends through holes provided therefor in the sides 48 of the box and which is attached at either end to the plates 66. A relatively long strip of flexible, translucent or transparent material 70 is rolled about the two spools 64 in such fashion, that the sheet covers the top surface of the box 26 along the portion in which the compartments 58 are located. In other words, the sheet 70 forms a cover for each of the compartments 58 of the box 26.

As can be seen from the illustration, the translucent sheet material 70 is provided with a series of indicia which cooperate with the remainder of the exposure indicating device, in the manner more fully described below, in order to indicate to an operator the proper exposure to be employed with the enlarger 12.

It will be observed from the drawing that the stationary contact elements 28 progressively increase in length from the lowermost contact, which is closest to the printing surface, upward toward the contact element which is most distant from the printing surface. This is an important feature of the invention. The reason for having the contact elements 28 of varied length is so that the exposure indicating device will automatically serve during use to compute in terms of arithmetic progression the geometric progression associated with the operation of the photographic enlarger. In other words, as is well known in the art, the exposure time, all other availables being constant, is not directly proportional to the distance fo the enlarger from the printing surface, i. e., the size of enlargement, but is a geometric function of this distance. By employing contact elements 28 of varying length, I make it possible to use a chart 70 with my exposure indicating device, the indicia of which are based upon an arithmetic progression. Because of the arrangement, it is possible for an operator to use my indicator without changing the scale once he has started printing and continue to use the same speed paper and the same developing conditions. In other words, the operator, when he begins his enlarging, will adjust the scale 70 to the place where the printing speed is correct for the conditions prevailing at the time and from then on there will be no need to change this setting, as long as the same development conditions are used with the same printing paper, no matter what size picture is printed. As the size of the picture is changed, the proper scale portion will be automatically illuminated and on the illuminated portion there will be indicated the proper exposure for any density of negative.

As indicated, the chart 70 has printed thereon the necessary indicia for indicating to the operator the required exposure. The nature of these indicia will be apparent to those skilled in the art and it is unnecessary for an understanding of this invention to discuss the specific details of these indicia. As will become apparent from the description of the operation of the exposure device given below, these indicia are arranged in horizontal lines upon the chart 70 so that the required data are simultaneously illustrated by any single light 60 of any single compartment 58 of the register box 26.

The operation of my photographic device can probably be most readily understood by reference to the wiring diagram shown in Figure 3. As has been indicated above, relative movements of the enlarger 12 with respect to the supporting rack 20 and the printing surface produce a corresponding, proportional movement in the sliding contact 32. Thus, as the enlarger 12 is caused to move vertically upward away from the printing surface, the sliding contact 32 will likewise be caused to move upward. As the contact 32 moves upward, it slides along the stationary contacts 28, causing a closed circuit to be formed through the battery 46 and the lamp 60 corresponding to the particular contact element 28 with which the particular light bulb is associated. Suppose then, that for a particular size enlargement, the slidable contact 32 comes to rest in contact with the stationary contact element 28a, as shown in Figure 3, this will cause a closed circuit to be formed, as described, through the electric light 60a and cause this light to be lit. It will be apparent that the lit bulb 60a will illuminate the portion of the transparent chart 70 which covers the top of the compartment 58 in which the bulb 60a is located. Moreover, the remainder of the light bulbs will not be lit nor will the portions of the translucent chart be illuminated. The operator of the enlarger 12 will, therefore, have before him, for immediate and constant reference, the necessary data required for the operation of the enlarger exposure process.

While my exposure device has been specifically described in connection with an embodiment which employs a sliding electrical contact which is rigidly mounted upon the enlarger and the use of stationary contact elements which are disposed in a straight line, it will be apparent that other forms may be used.

The apparatus, as described above, provides an exposure indicating device which makes possible the immediate and automatic indication of necessary exposure data for the operation of photographic enlarger, in particular auto-focussing enlargers. Using my exposure device any photographer is able to speed up his work and, moreover, the quality of the work is correspondingly increased.

As many and varied modifications of this invention will become apparent to those skilled in the art from the detailed description given hereinbefore, it is understood that this invention is to be limited only in accordance with the appended claims.

I claim:

1. Photographic apparatus comprising in combination an enlarger, a series of stationary electrical contact elements of progressively increasing length, a movable contact slidably engaging said contact elements and connected to said enlarger whereby movements of said enlarger relative to a printing surface produce a proportional movement in said movable contact, a separate light electrically connected through said movable contact to each of said separate stationary contact elements and a movable, tape-like chart which may be moved lengthwise relative to said lights having indicia thereon for indicating the exposure to be used for any particular setting of said enlarger in accordance with the particular light which is lit by movement of the enlarger relative to the printing surface.

2. Photographic apparatus comprising in combination an enlarger, a row of stationary electrical contact elements of progressively increasing length, a movable contact slidably engaging said contact elements, means connecting said movable contact to the lamp housing of the enlarger whereby movements of the enlarger relative to a printing surface produce a proportional movement in said movable contact, a row of lights, each separate light in the row being electrically connected through said movable contact to one of said separate stationary contact elements, a housing for said row of lights having a separate compartment for each light, rollers in the ends of the housing, and a translucent tape carried upon the rollers for movement lengthwise over said lights, said chart having indicia thereon for indicating the exposure to be used for any particular setting of said enlarger in accordance with the particular light which is lit by movement of the enlarger relative to the printing surface.

3. Apparatus as claimed in claim 1, wherein said movable contact connecting means is a shaft connected at one end to the enlarger lamp housing and at the other end to the movable contact.

4. Apparatus as claimed in claim 1, wherein said stationary contact elements are in a row positioned perpendicular to said printing surface and increase in length in proportion to their distance from said printing surface.

5. Photographic apparatus which comprises a series of stationary electrical contact elements of progressively increasing length, a movable contact slidably engaging said stationary contact elements, means connecting said slidable contact to an enlarger whereby movements of the enlarger relative to a printing surface produce a proportional movement in said movable contact relative to said stationary contact elements, a separate light electrically connected through said movable contact element to each of said separate stationary contact elements and a movable, tape-like chart which may be moved lengthwise relative to said lights having indicia thereon for indicating the exposure to be used for any particular setting of said enlarger in accordance with the particular light which is lit by movement of the enlarger relative to the printing surface.

6. Photographic apparatus which comprises a row of stationary electrical contact elements positioned perpendicularly to the printing surface of an enlarger, said contact elements increasing in length in proportion to their distance from said printing surface, a movable contact slidably engaging said stationary contact elements, means attached to said slidable contact connecting the slidable contact to the lamp housing of an enlarger positioned above said printing surface whereby movements of the enlarger relative to the printing surface produce a proportional movement in said movable contact, a row of lights, each separate light in the row being electrically connected through said movable contact to one of said separate stationary contact elements, a housing for said row of lights having a separate compartment for each light, rollers in the ends of the housing, and a translucent tape carried upon the rollers for movement lengthwise over said lights, said tape having indicia thereon for indicating the exposure to be used for any particular setting of said enlarger in accordance with the particular light which is lit by movement of the enlarger relative to the printing surface.

7. A photographic exposure indicating device for use with a photographic enlarger which comprises a series of stationary, electrical contact elements of progressively increasing length, a movable contact slidably engaging said stationary contact elements, means connected to said movable contact adapted for direct connection to an enlarger whereby movements of the enlarger relative to a printing surface will produce a proportional movement in said movable contact relative to said stationary contact elements, a separate light electrically connected through said movable contact element to each of said separate stationary contact elements, and a movable, tape-like chart which may be moved lengthwise relative to said lights having indicia thereon for indicating the exposure to be used for any particular setting of said enlarger in accordance with the particular light which is lit by movement of the enlarger relative to the printing surface.

8. A photographic exposure indicating device for use with a photographic enlarger which comprises a row of stationary electrical contact elements, each element of which increases in length in proportion to the distance from the front end of the row, a movable contact slidably engaging said stationary contact elements, means attached to said movable contact adapted for direct connection to the lamp housing of an enlarger whereby movements of the enlarger relative to a printing surface will produce a proportional movement in said movable contact relative to said stationary contact elements, a row of lights, each separate light in the row being electrically connected through said movable contact to one of said separate stationary contact elements, a housing for said row of lights having a separate compartment for each light, rollers in the ends of the housing, and a translucent tape carried upon the rollers for movement lengthwise over said lights, said chart having indicia thereon for indicating the exposure to be used for any particular setting of said enlarger in accordance with the particular light which is lit by movement of the enlarger relative to the printing surface.

JOHN M. BENTON.

REFERENCES CITED

The following references are of record in the file of this patent:

UNITED STATES PATENTS

| Number | Name | Date |
| --- | --- | --- |
| 1,716,517 | Chamberlain | June 11, 1929 |
| 690,800 | Walther | Jan. 7, 1902 |
| 1,926,597 | Naumann | Sept. 12, 1933 |
| 2,166,419 | O'Neill | July 18, 1939 |
| 2,384,019 | Dye | Sept. 4, 1945 |